United States Patent [19]

Fukukawa et al.

[11] Patent Number: 4,729,502

[45] Date of Patent: Mar. 8, 1988

[54] APPARATUS FOR TREATING ENDS OF LARGE-DIAMETER WELDED PIPE

[75] Inventors: Yoshitsuga Fukukawa; Atsushi Nishida, both of Chiba; Mamoru Nishioka, Kyoto; Akio Takemori, Nara, all of Japan

[73] Assignees: Sumitomo Metal Industries, Ltd.; Kashiwara Machine Manufacturing Co., Ltd., both of Osaka, Japan

[21] Appl. No.: 945,960

[22] Filed: Dec. 24, 1986

[30] Foreign Application Priority Data

Dec. 27, 1985 [JP] Japan ................... 60-296968
Dec. 27, 1985 [JP] Japan ................... 60-296969

[51] Int. Cl.$^4$ ............................................. B23K 7/04
[52] U.S. Cl. ........................................ 228/13; 228/19; 29/33 D; 29/33 T
[58] Field of Search ................. 228/125, 160, 13, 19; 29/33 D, 33 T, 33 A, 33 B

[56] References Cited

U.S. PATENT DOCUMENTS 537,276  4/1895  Coffin ................................. 228/19

FOREIGN PATENT DOCUMENTS 181530  10/1983  Japan ................................. 228/19
171056  11/1984  Japan ................................. 228/19
716781   2/1980  U.S.S.R. ............................. 228/125

Primary Examiner—Nicholas P. Godici
Assistant Examiner—Samuel M. Heinrich
Attorney, Agent, or Firm—Burns, Doane, Swecker & Mathis

[57] ABSTRACT

A large-diameter welded steel pipe having a straight seam and tab plates attached to its ends as extensions of the seam is laid along a setting line with the seam upward. An apparatus for treating the ends of such a pipe has a tab plate cutting unit and a bead removing unit. The tab plate cutting unit cuts the tab plates off with a torch. The bead removing unit removes the weld beads on the inner surface of the ends of the pipe by cutting them with a rotary cutter.

2 Claims, 21 Drawing Figures

APPARATUS FOR TREATING ENDS OF LARGE-DIAMETER WELDED PIPE

BACKGROUND OF THE INVENTION

The present invention relates to an apparatus for treating the ends of a large-diameter welded pipe and, more particularly, to an automated apparatus for continuously cutting tab plate of a large-diameter straight seam steel pipe after welding and removing inside beads of the ends of the pipe. The term "treating the ends of a pipe" or "pipe-end treatment" used herein and in the claims is to be understood to mean such operations as cutting tab plates and removing inside beads from the ends of the pipe.

In conventional pipe-end treatment of this kind, the pipe is treated either with the seam upward or with the seam downward. The pipe-end treating apparatus according to the present invention is applied to pipe-end treatment of the type wherein the seam is upward.

In order to improve the quality of products over the entire length of the seam in the manufacture of straight-seam pipes, it is conventional, as shown in FIG. 2, to connect tab plates to an end face of a formed pipe P along a seam line B thereof and to perform preparatory welding over a distance of 10-20 cm on the tab plates T. In welding along the straight seam B, however, welding defects usually occur at the beginning and at the end of the welding seam. Therefore, tab plates are attached to the ends of the pipe before forming so that these welding defects are confined to the tab plates.

After welding the pipe, the tab plates become unnecessary and must be immediately removed. Heretofore, this tab removing work has been a task for manual labor and thus has been low in efficiency. Furthermore, being a simple and repetitive operation, it has been considered undesirable in terms of work strategy.

In view of the situation described above, mechanization is most eagerly desired for the step of cutting off the tab plates and removing the inside beads in the neighborhood of the ends of the pipe. However, mechanization of this step is very difficult. Some known automated apparatuses for carrying out work of this kind are those described, for example, in Japanese Patent Public Disclosure No. 181530/83 Official Gazette and Japanese Utility Model Public Disclosure No. 171056/84 Official Gazette. However, these known apparatuses have not been successful in satisfying the requirements described below.

That is, in mechanizing the pipe-end treating operation, the following problems must be fully overcome:

(i) In the ends of a straight seam pipe after welding, the tab plates usually fail to match each other along the seam line B as shown in FIGS. 2 and 3. In such a case, it is desired that the mismatched pipe end is cut as little as possible, as shown by a dashed line C in FIG. 3, from the viewpoint of the need to maintain yield. It is also desirable for the pipe end to be cut at a small angle at the start and end points of cutting in order to minimize adverse effects on the succeeding steps (such as expanding and bevelling steps).

(ii) Since gas cutting is used, when cutting oxygen is blown at a cutting start point A, a defect is caused in the pipe end, as shown in FIG. 3, which deteriorates the sectional shape and lowers the yield of the pipe.

(iii) The thickness of the bead portion becomes 1.2-2 times that of the pipe itself and this increased thickness sometimes makes it impossible to cut the bead portion in the same cutting condition as that of the pipe itself.

(iv) In order to continue a stable cutting operation even when the pipe diameter changes or when the pipe curvature is not uniform in the circumferential direction, it is necessary to keep the cutting torch being used at an adequate distance from the outer peripheral surface of the pipe and in a position substantially at right angles to a tangent of the cutting point during the cutting operation.

(v) Mechanization will not be beneficial if the construction employed is too complicated or accuracy is low.

When reviewed from the view-point of the requirements mentioned above, the known apparatuses referred to have certain disadvantages. That is, the apparatus described in Japanese Patent Public Disclosure No. 181530/83 Official Gazette requires electrical calculation in order to detect the degree of mismatch of the pipe end along the seam line, thereby requiring a complicated detecting device and increasing the cost thereof. Further no effective measure is available for avoiding the defect at the cutting start point A, thereby resulting in a reduced yield rate. Since the cutting at the pipe end is performed at a given low speed so as to effectively cut the bead portion, the efficiency is low. Furthermore, in this known apparatus which is intended to treat pipes with the seam downward, since a tab plate cutting device and an inside bead removing device interfere with each other on the same side, this apparatus requires a completely different concept in design from the type of apparatus which is intended to treat pipes with the seam upward.

On the other hand, while the apparatus described in Japanese Utility Model Public Disclosure No. 171056/84 is intended to treat pipes with the seam upward, it is not provided with means for detecting mismatch at the pipe end and it cuts the tab plates along a uniform locus, resulting in a serious loss of accuracy and reduction in yield rate. Furthermore, this apparatus is not provided with any effective means of avoiding the defect at the cutting start point A or with any effective measures with respect to cutting the bead portion of the pipe.

In a large-diameter straight seam welded pipe, the inside weld bead represents an obstacle in clamping during circumferential welding of the pipe and must be completely removed at least from the ends of the pipe. This inside bead removing operation is deemed undesirable from the viewpoint of efficiency and job strategy because it is a simple and repetitive manual operation and it has long been desired that the working environment be improved because a large quantity of dust is caused when removing the inside bead by a grinding operation.

Accordingly, several apparatuses have been suggested in the past for removing the inside bead, such as those described in said Japanese Patent Public Disclosure No. 181530/83 Official Gazette and Japanese Utility Model Public Disclosure No. 171056/84 Official Gazette. However, since the straight seam welded pipes are not perfectly circular in section (see FIG. 6) and rather deficient in straightness (see FIG. 7), none of these known apparatuses has been completely successful in dealing with such pipes for the reasons explained below.

In the apparatus described in Japanese Patent Public Disclosure No. 181530/83 Official Gazette, as shown in FIG. 4, the inside weld beads of the welded pipe P are removed by a grinding wheel G which rotates while swinging peripherally around the pipe with its rotary shaft maintained parallel to the line of the inside weld beads. On the other hand, in the apparatus described in Japanese Utility Model Public Disclosure No. 171056/84 Official Gazette, as shown in FIG. 5, the inside weld beads are removed by the grinding wheel G with its rotary shaft maintained perpendicular to the line of the weld beads.

However, the welded pipe P is, as shown in FIGS. 6 and 7, neither perfectly round nor perfectly straight. Particularly at the ends from which the beads are to be removed, the pipe generally has a chestnut-shaped cross section and an convex longitudinal section on the side of the weld beads B. The deviation from perfect roundness and perfect straightness varies from pipe to pipe and is particularly remarkable in the stage prior to a pipe expanding step (or bead removing step), which is mainly undertaken for the purpose of maximizing the roundness and straightness of the pipe.

In the case where the apparatus shown in FIG. 4, or FIG. 5 is applied to the welded pipe P as described above, when the welded pipe P has a markedly chestnut-shaped cross section, the apparatus shown in FIG. 4 in particular has a disadvantage in that the base metal of the pipe on both sides of the weld beads B is ground away. This disadvantage becomes greater as the diameter of the grinding wheel G becomes larger.

In the welded pipe P, the lower limit of thickness is defined, and strict control of thickness is required for the beads and the steel in their neighborhood to avoid any concentration of stress. The grinding wheel G is necessarily complicated in regard to the fact that the position of the grinding wheel G relative to the weld beads B must be changed every movement in response to abrasion caused in the grinding wheel G. The grinding wheel G involves a further problem in that dust and vibration caused by grinding decrease the mechanical accuracy of machines disposed in the neighborhood of it. The grinding wheel G must have a relatively large diameter and grain size to ensure grinding efficiency. On the other hand, however, the large diameter and grain size of the grinding wheel G results in a reduction in the grinding accuracy and the possibility of the base metal of the pipe being ground away as described above.

The apparatus shown in FIG. 5 requires the use of a grinding wheel G having a small diameter to avoid the possibility of grinding the base metal away. The grinding wheel G with a small diameter has certain disadvantages, however, such as low grinding efficiency and so on.

Accordingly, an object of the present invention is to provide an apparatus for treating the ends of large-diameter welded pipe, in which all of the problems of the prior art described above can be obviated.

Another object of the present invention is to provide an apparatus for treating the ends of large-diameter welded pipe which is simple in structure, economical to manufacture, and offering high and stable work accuracy.

SUMMARY OF THE INVENTION

The apparatus for treating the ends of large-diameter welded pipe according to the present invention mainly comprises a machine frame assembly, a U-shaped holding member, a tab plate cutting unit, and a weld bead removing unit.

A large-diameter welded steel pipe having a straight seam and tab plates attached to the ends of the pipe as extensions of said seam is laid down along the setting line with said seam facing upward.

The machine frame assembly is so disposed along the setting line as to be movable longitudinally, laterally, and vertically. The U-shaped holding member is so connected to the machine frame assembly as to be rotatable about the setting line and a horizontal line perpendicular to it. The tab plate cutting unit is attached to an upper jaw of the U-shaped holding member. The weld bead removing unit is attached to a lower jaw of the U-shaped holding member.

The tab plate cutting unit comprises a clamping means for fixing said upper jaw onto the outer surface of the pipe; a laterally movable block and a driving means therefor; a vertical member attached to said movable block so as to be movable longitudinally of the pipe and to be movable toward and away from the outside of the pipe by an urging means; a tracing member which has two contact points on the outer surface of the pipe arranged circumferentially thereof and is pivotally supported on said vertical member by a shaft extending axially of the pipe; a cutting torch mounted downwardly on said tracing member; a pair of contact pieces in resilient contact with the end of the pipe on both sides of the tab plate; links which are connected to said contact pieces and held parallel respectively to lines connecting said contact pieces and said cutting torch, and pivotally supported bendably on a substantially horizontal plane at positions corresponding to the contact pieces and said cutting torch, with the pivotal point at a mid-point fixed to the frame which forms said upper jaw; a second tracing member for tracing the longitudinal profile of said links, connected to said vertical member so as to be movable toward and away from said movable block; and a driving means for driving said second tracing member longitudinally of the pipe relative to a support of said tracing member.

The weld bend removing unit removes the inside weld beads formed along the straight seam on the inside of the pipe only from the ends of the pipe. The weld bead removing unit comprises a first movable base disposed within the pipe for parallel movement relative to said inside weld beads, a second movable base attached to said first movable base for movement toward and away from said inside weld beads by an urging means; an inclinable head attached to said second movable base for inclination toward and away from the movement of said fist movable base; a rotary cutting tool attached to said inclinable head and facing said inside weld beads; a tracing roller attached to said inclinable head in proximity to said rotary cutting tool for adjustment of the length of projection of said rotary cutting tool head relative to said head; and a clamping means attached to said lower jaw for fixing said lower jaw to the inner surface of said pipe.

The machine frame assembly is movable forward and backward along the setting line (X axis), laterally along the horizontal line (Y axis) perpendicular to the setting line, and vertically along the vertical line (Z axis) perpendicular to the setting line. The positions of the tab plate cutting unit and the weld bead removing unit relative to the welded pipe are adjusted roughly by adequate forward and backward, lateral and vertical movement of the machine frame assembly.

Since the U-shaped holding member is rotatable about the X axis and the Y axis relative to the machine frame, the position of each unit relative to the seam of the welded pipe is roughly adjusted by the U-shaped holding member.

The tab plate cutting unit cuts the portion at which the tab plate is connected to the end of the pipe at the highest yield rate. This tab plate cutting unit operates in the manner described below.

The contact pieces abut against the end of the pipe, and the links incline in response to the degree of mismatch at the end of the pipe. Since the second tracing member is normally in abutment with the links such as to position the vertical member connected thereto longitudinally of the pipe, when the movable block moves laterally along the links the cutting torch supported by the vertical member moves longitudinally forward or backward in response to the degree of mismatch at the end of the pipe and cuts the tab plates off. In this manner, without the need for electrical detection or computation, the mismatch at the end of the pipe is automatically detected and the cutting torch automatically traces the pass in response to the degree of mismatch.

According to this treating apparatus, the second tracing member is provided with the longitudinally driving means for its support to thereby adequately adjust the quantity of movement of the cutting torch longitudinally of the pipe, so it is possible to cause the cutting torch to trace any passes other than that mentioned above. Therefore, it is made possible to prevent defects at the end of the pipe at the beginning of cutting and to freely determine the cutting angle with respect to the end of the pipe at the beginning and the end of cutting.

The weld bead removing unit removes the inside beads at the end of the pipe in the neighborhood of the portion to which the tab plates are attached. This weld bead removing unit operates in the manner described below.

The weld bead removing unit removes the inside weld beads by pushing the second movable base toward the inside weld beads by means of the urging means and moving the first movable base along the inside weld beads while rotating the rotary cutting tool with the distance between the rotary cutting tool and the inner surface of the welded pipe regulated by the tracing roller. Since the rotary cutter is used as the bead cutting tool, abrasive wear of the tool is reduced, substantially no dust and vibration is caused, and the cutter is small in diameter and yet high in grinding efficiency and enables the radius of the inside weld bead cutting arc to be freely adjusted since the angle of inclination $\theta$ of the inclinable head can be changed. That is, the cutting surface of the inside weld beads is a plane with the inclinable head held vertical. However, when the inclinable head is given an angle of inclination $\theta$, the bead cutting surface becomes an arc as viewed in the longitudinal direction of the bead and its radius becomes smaller as the angle of inclination $\theta$ becomes larger. Further, this arc radius adjusting function, combined with the small radius of the rotary cutter, makes very precise control of the thickness of the beads and the steel in the vicinity thereof possible.

The tab plate cutting unit and the weld bead removing unit are operated simultaneously. These two units are constructed in such a manner that they do not interfere with each other when operating.

BRIEF DESCRIPTION OF THE DRAWINGS

The invention will be better understood from the following description, taken in connection with the accompanying drawings, in which:

FIG. 16 is an illustration of a locus of movement of a cutting tool;

DETAILED DESCRIPTION OF THE PREFERRED EMBODIMENTS

Figure 1:
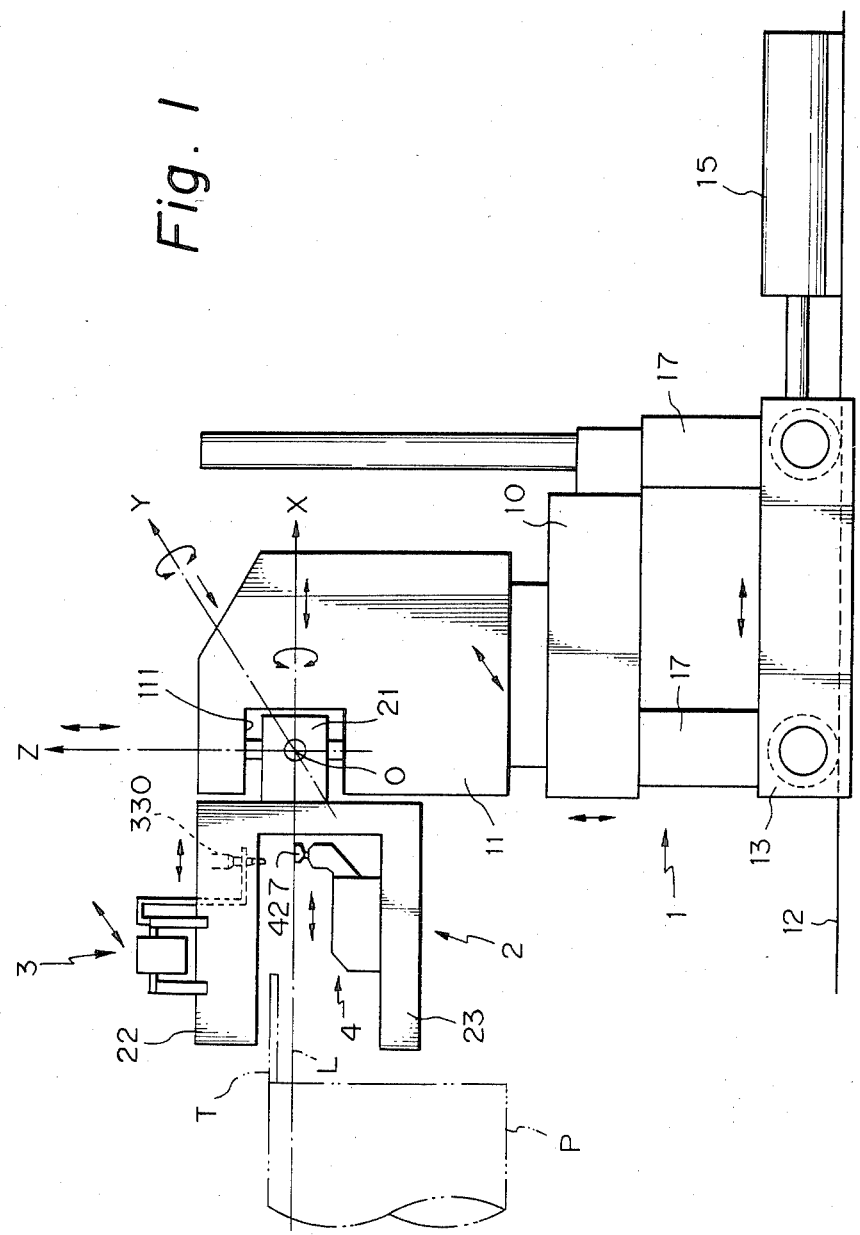
FIG. 1 is a side view of the apparatus for treating the ends of large-diameter welded pipe according to the present invention.

With reference now to the drawings and more particularly to FIG. 1 thereof, an apparatus for treating the ends of a large-diameter welded steel pipe according to the present invention is shown, the apparatus, comprising a machine frame assembly 1, a U-shaped holding member 2, a tab plate cutting unit 3, and a weld bead removing unit 4.

Figure 2:
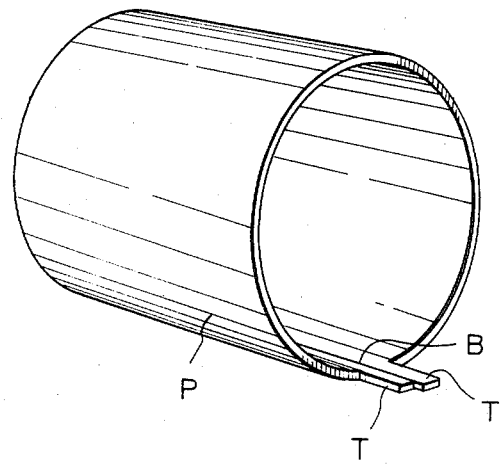
FIG. 2 is a perspective view of a straight seam pipe after being welded.

A large-diameter welded steel pipe P has a straight seam B (see FIG. 2) and tab plates attached to the ends of the pipe as extensions of the seam B on both sides thereof. Weld beads are formed along the straight seam B. The steel pipe P is laid along a setting line L with the straight seam B upward.

Figure 9:
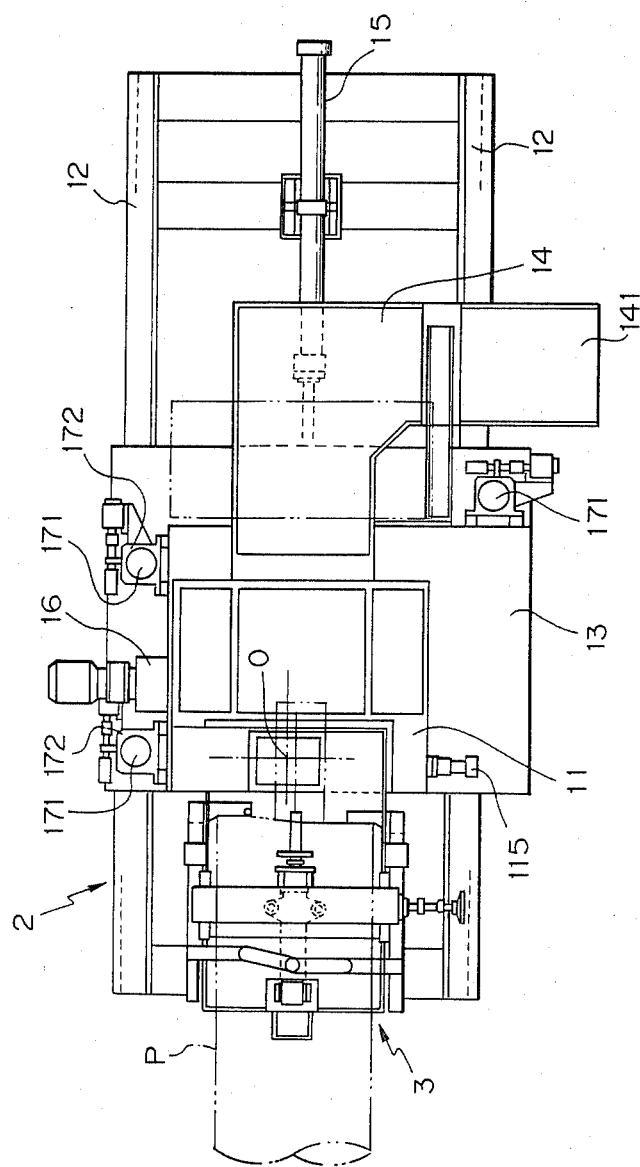
FIG. 9 is a plan view of the apparatus shown in FIG. 8.

The center of connection between the machine frame assembly 1 and the U-shaped holding member 2 is 0 (see FIG. 9). Assuming three dimensional rectangular coordinate axes X, Y and Z with the center 0 as the origin, the machine frame assembly 1 is so disposed that the X axis is parallel to the setting line L.

The machine frame assembly 1 is movable forward and backward along the setting line L (X axis), laterally along the horizontal line (Y axis) perpendicular to the line L, and vertically along the vertical line (Z axis)

perpendicular to the line L. By adequate forward and backward and lateral and vertical movement of the machine frame assembly 1, the relational positions of the tab plate cutting unit 3, the weld bead removing unit 4, and the welded steel pipe P are roughly adjusted.

The machine frame assembly 1 comprises mainly, as shown in FIGS. 1, 8, 9 and 10, a lifting table 10, a machine frame 11, rails 12, a truck 13, chute 14, a longitudinally driving means 15, a laterally driving means 16, and a vertically driving means 17.

As shown in the drawings, a pair of rails 12 are laid parallel to the setting line L of the straight seam pipe P, and the truck 13 rests on the rails 12.

Figure 10:
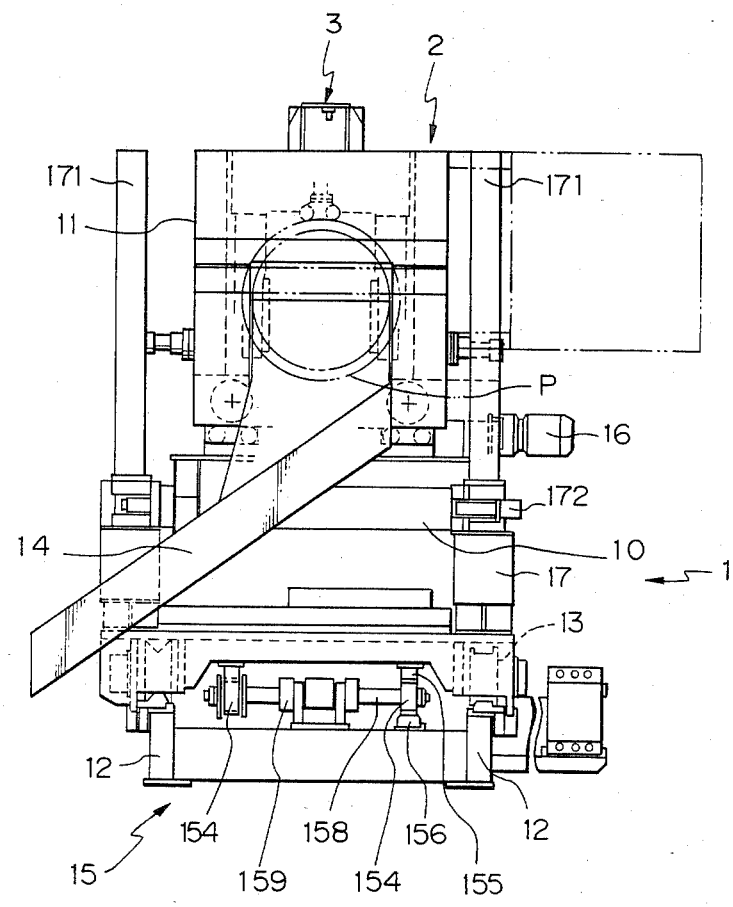
FIG. 10 is a rear view taken along the line X—X of FIG. 8.

The longitudinally driving means 15 comprises a combination of conventional rack-pinion and a fluid pressure cylinder. In this means 15, as best shown in FIG. 10, driving gears 154 are disposed under the truck 13 and engage with a rack 155 provided on the truck 13 and a rack 156 provided on the ground, and the tip end of a rod of a cylinder 157 provided on the rear of the truck 13 engages with a support shaft 158 of the gears 154 through a bearing 159.

The lifting table 10 is mounted on the truck 13 through the conventional vertically driving means 17. Guide posts 171 are fixed vertically on the truck 13 to secure stable vertical movement of the lifting table 10. A clamper 172 provided on the rear of the lifting table 10 engages with the guide posts 171 to hold the stop position of the lifting table 10.

The machine frame 11 is laterally (in the direction of Y axis) movably mounted on the lifting table 10 and is moved in the direction of Y axis by the conventional laterally driving means 16.

The U-shaped holding member 2 has a U-shaped section and is, as best shown in FIG. 1, connected to the machine frame 11 with its open side inverted toward the setting line L and with its base projection 21 fitted into a cavity 111 of the machine frame 11. Hereinafter, the end toward the open side of the member 2 is called forward and the end toward the base projection 21 of the member 2 is called backward, with respect to the setting line L, respectively.

As described above, the U-shaped holding member 2 is connected to the machine frame 11 so as to be rotatable about X axis and Y axis. This is to follow the bend at the end of the pipe and the circumferential displacement of the seam. A lock pin cylinder 115 attached to a side of the machine frame 11 is for fixing the holding member 2 with respect to the outer surface of the steel pipe.

Figure 12:
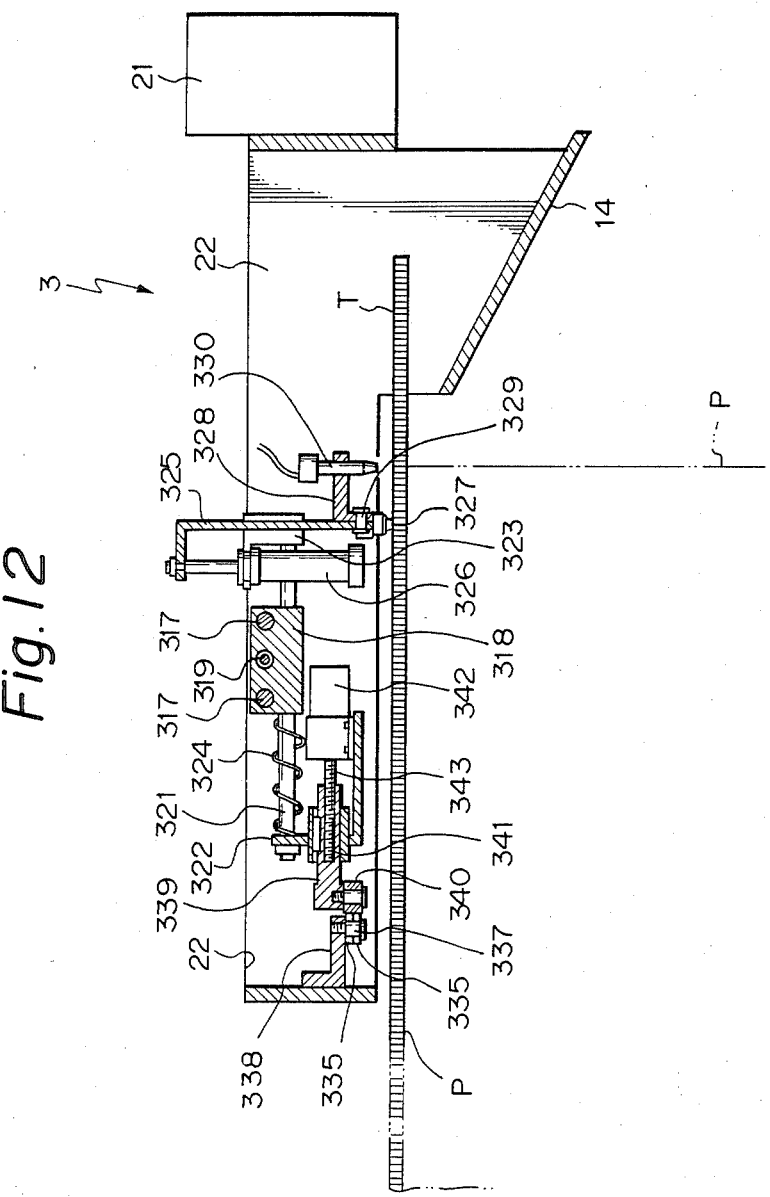
FIG. 12 is a longitudinal sectional view taken along the line XII—XII of FIG. 11.
Figure 13:
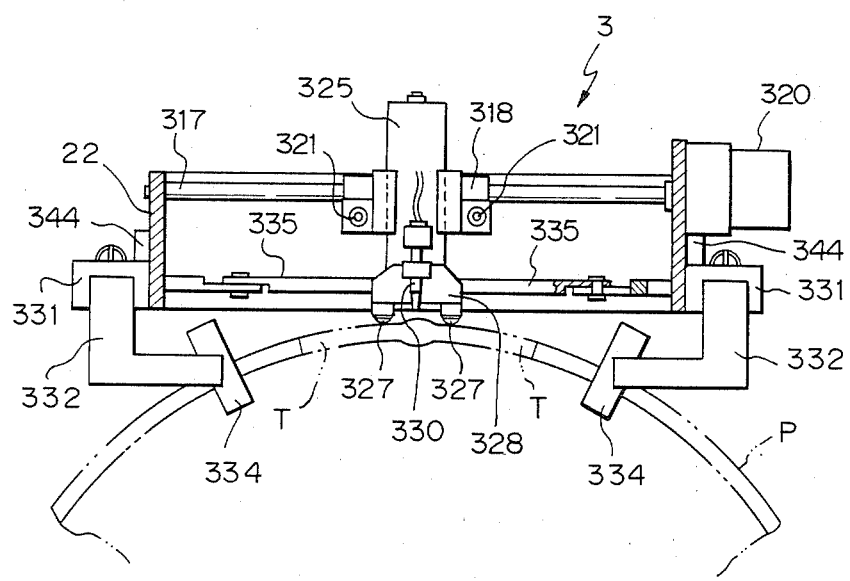
FIG. 13 is a front view taken along the line XIII—XIII of FIG. 11.

The tab plate cutting unit 3 is mounted on an upper jaw 22 of the holding member 2. The construction of the tab plate cutting unit 3 is shown in FIGS. 11 to 13 in greater detail, in which FIG. 11 is a plan view, FIG. 12 is a longitudinal sectional view taken along the line XII—XII of FIG. 11, and FIG. 13 is a front view taken along the line XIII—XIII of FIG. 11.

Figure 11:
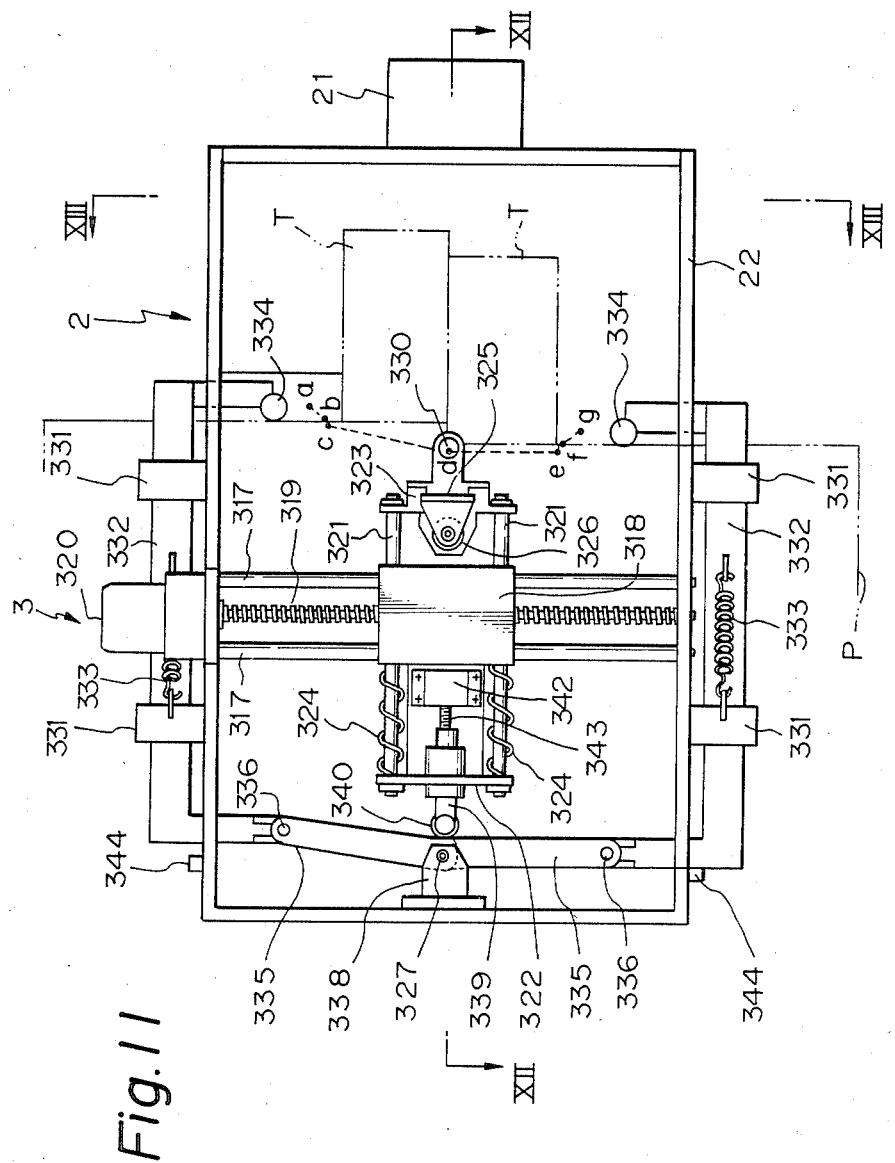
FIG. 11 is a plan view of a tab plate cutting unit.

As best shown in FIG. 11, the upper jaw 22 is a frame body opened at the top and bottom and having two guide rods 317 extending laterally therewithin and a movable block 318 attached slidably on the guide rods 317. Disposed between and parallel to the two guide rods 317 is a screw shaft 319 in threadable engagement with the movable block 318, and a driving motor 320 for the screw shaft 319 is mounted on a side of the frame of the upper jaw 22. The movable block 318 is provided with two shafts 321 which are slidable in the longitudinal direction of the frame, and the front and rear ends of the shafts 321 are securely connected by plates 322 and 323, respectively. The shafts 321 are provided with springs 324 which are respectively inserted between the front plate 22 and the movable block 318 so as to urge the shafts 321 forward with respect to the movable block 318.

A vertical member 325 is vertically movably attached to the rear portion of the rear plate 323. A cylinder 326 secured vertically to the front portion of the plate 323 has a rod locked at its ends to the upper portion of the vertical member 325 so as to urge the vertical member 325 upward and downward. A tracing member 328 having two contact balls 327 arranged peripherally of the pipe P is journalled in the lower portion of the vertical member 325 so as to be rotatable about an axially extending shaft 329 and maintained normally in a horizontal position by means of a pair of unillustrated springs secured at one end to the movable block 318 and at the other end to the tracing member 328. Mounted behind the tracing member 328 is a downward cutting torch 330 extending perpendicularly with respect to the line connecting the two contact balls 327.

The upper jaw 22 is further provided on both sides thereof with guides 331 to which a pair of connecting rods 332 of equal length are axially movably fitted, respectively. The connecting rods 332 are normally urged forwardly by springs 333. Provided at the rear ends of the connecting rods 332 are contact pieces 334 for abutment with the end of the pipe which are prevented from interfering with the frame body and the cutting torch 330. The distance between the contact pieces 334 must be larger than the total width of the two tab plates T attached to the end of the pipe which are parallel to each other.

On the other hand, two connected links 335 are connected between the forward ends of the two connecting rods 332. The positions at which the connecting rods 332 and the links 335 connect are substantially forward of the contact pieces 334, and at these positions the links 335 are pivotally supported by means of shafts 336 which are slidably slightly laterally to enable the links 335 to bend. The position at which the two links 335 connect is forward of the midpoint between the contact pieces 334, and at this position the links 335 are supported pivotally by means of a vertical shaft 337 and a bracket 338 is secured to the inner face of the front of the frame body.

A second tracing member 339 projecting forwardly of the front plate 322 has a contact roller 340 held in resilient contact with the rear face of the links 335 by means of the spring 324. The second tracing member 339 is axially movably mounted on the front plate 322 and has a female screw 341 formed therewithin into which a shaft (male screw) 343 of a motor 342 secured to the side of the front plate 322 is rotatably inserted to enable the second tracing member 339 to move forward and backward independently of the front plate 322. Provided on both the outer side of the frame body are sensors 344 for sensing the rear ends of the connecting rods 332 at the positions at which the links 335 extend perpendicularly to both sides of the frame body.

Figure 8:
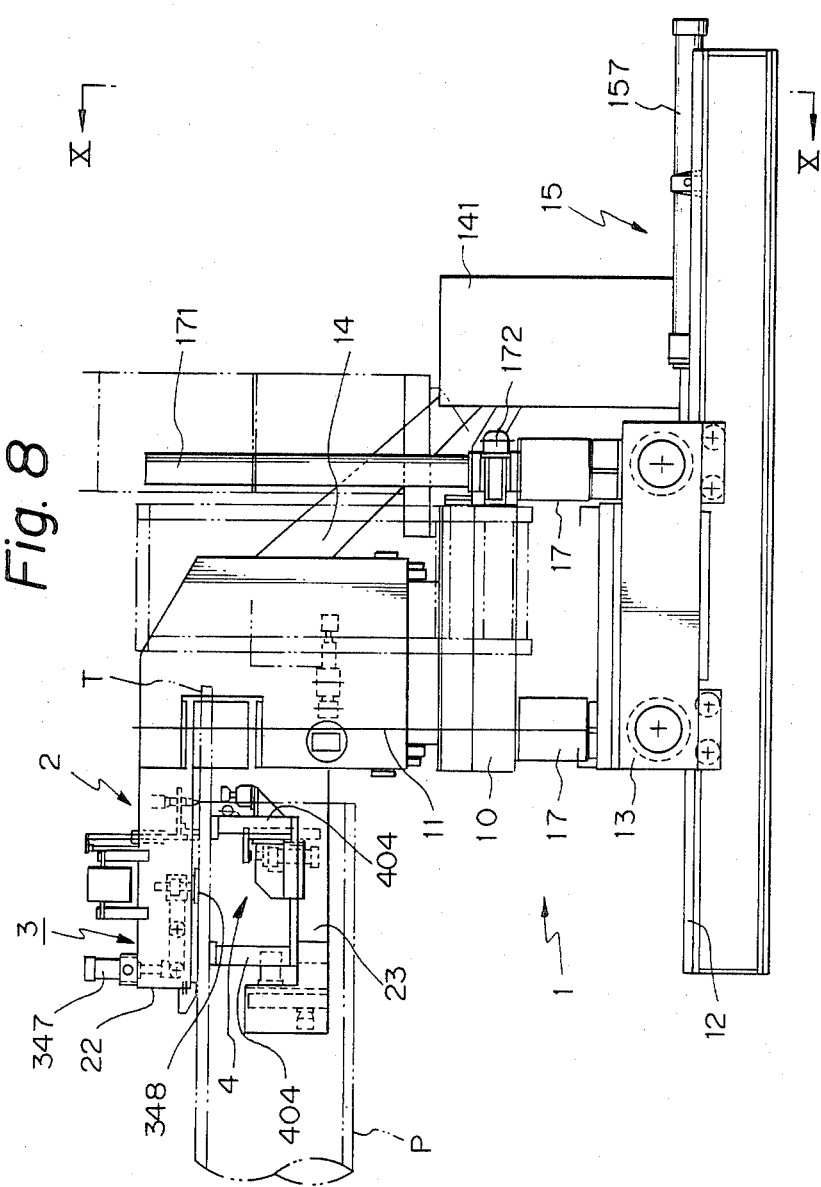
FIG. 8 is a side view similar to FIG. 1 showing the construction of the apparatus in more detail.

As best shown in FIG. 8, a clamper 348 actuated by a cylinder 347 is disposed in the neighborhood of the forward end of the upper jaw 22. The operation of the clamper 348 will be described in detail hereinbelow.

As best shown in FIG. 9, the chute 14 extends through the machine frame 11 for guiding the tab plates which have been cut away from the pipe into a scrap bag 141 disposed on the outside of the apparatus.

Figure 14:
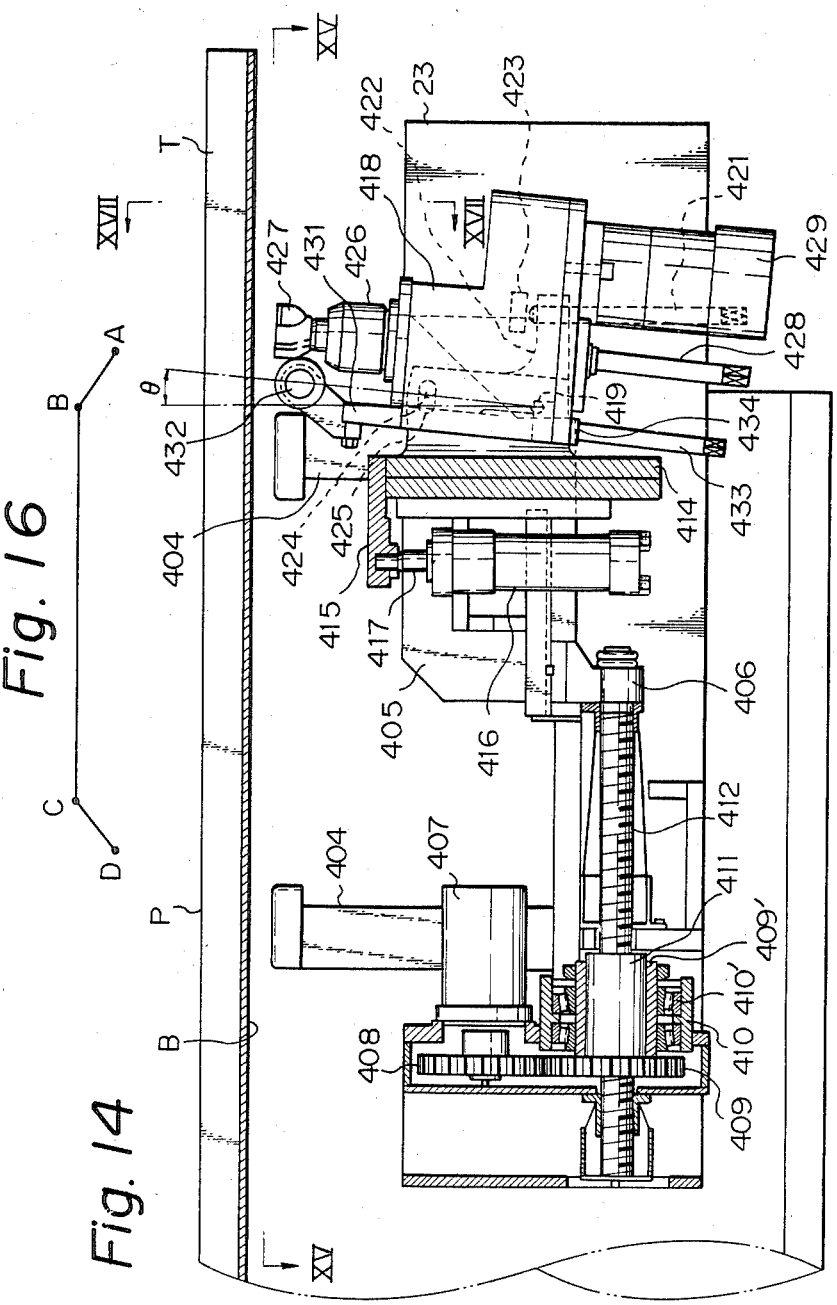
FIG. 14 is a side view of a weld bead removing unit.
Figure 15:
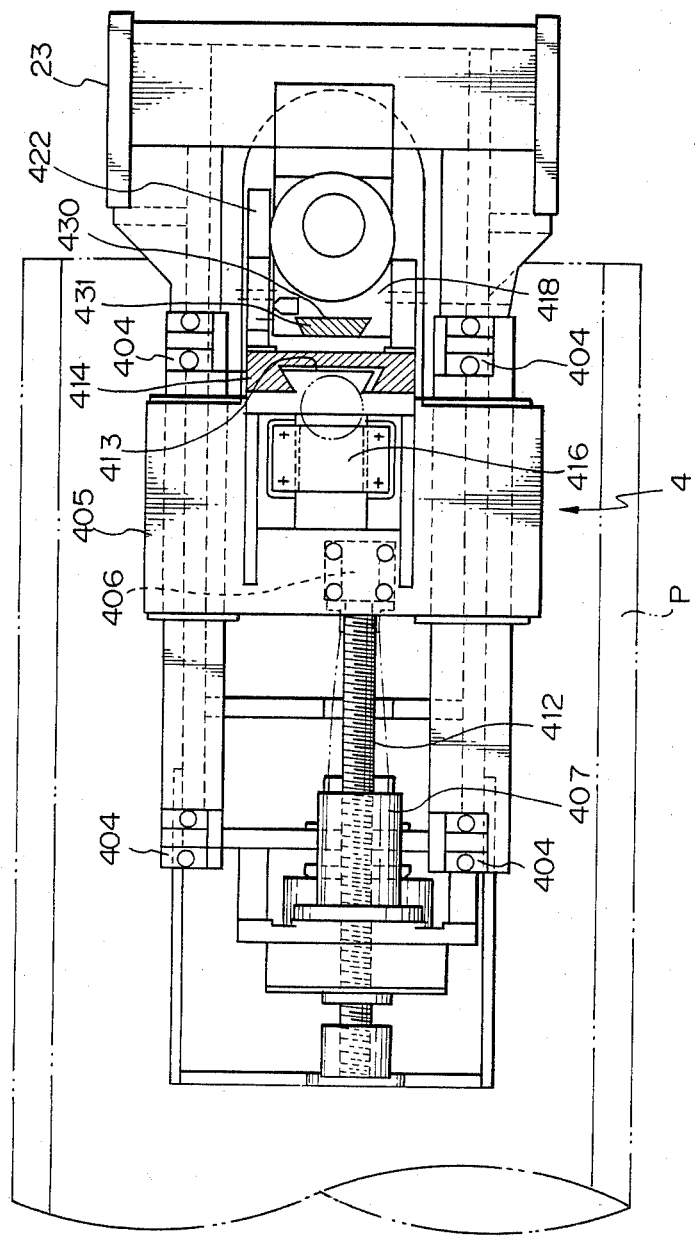
FIG. 15 is a plan view taken along the line XV—XV of FIG. 14.

The weld bead removing unit 4 is attached to a lower jaw 23 of the U-shaped holding member 2 by means of a form of construction shown in detail in FIGS. 14 and 15.

FIG. 14 is a side view of the weld bead removing unit 4. FIG. 15 is a plan view taken along the line XV—XV of FIG. 14. FIG. 16 shows a locus of movement of the cutting tool.

The lower jaw 23 is provided with a first movable base 405 attached longitudinally movably thereof and with a bracket 406 disposed in the inner portion of the pipe P. Hereinafter, the inner side of the pipe is called the front or forward side and the side opposite thereto is called the rear or backward side. A clamper 404 is disposed on each of the forward and backward sides of the lower jaw 23. A motor 407 is attached to the forwardmost end of the lower jaw 23 and a gear 408 secured to the rotary shaft of the motor 407 engages with a gear 409. The gear 409 has its barrel 409' supported by a bearing 410 secured to the lower jaw 23 through a bearing 410' and has a nut 411 securely fitted inside the barrel 409'. A screw shaft 412 parallel to the lower jaw 23 is in threadable engagement with the nut 411 and has its backwardmost end locked unrotatably to the bracket 406 attached to the front portion of the first movable base 405.

A second movable base 414 is vertically (in the direction of Z-axis) movably attached to the backwardmost end of the first movable base 405 through a dovetail groove 413. A cylinder 416 disposed upright as an urging means in the rear part of the first movable base 405 has one end of its rod 417 locked to an arm 415 extending forwardly from the top of the second movable base 414.

The second moveable base 414 is of a backwardly opened substantially U-shaped bracket construction and an inclinable head 418 is supported thereby so as to be inclined backwardly by means of a shaft 419. A screw rod 421 in vertically threadable engagement with an arm 422 extending backwardly from the lower portion of the second movable base 414 has its upper end in abutment with the lower face of an arm 423 extending laterally of the inclinable head 418 for adjustment of the inclination (θ) of the inclinable head 418. Denoted by 424 is a lock bolt of inclination (θ) threaded into the inclinable head 418 through a guide hole 425 provided in a side plate of the second movable base 414.

A chuck 426 is inserted from above into the top of the inclinable head 418 and a rotary cutter 427 is mounted on the chuck 426. The chuck 426 is fixed to the inclinable head 418 by being pulled downward by means of a screw rod 428. While not shown in detail, the chuck 426 is supported by a bearing within the inclinable head 418, and its inner ring is connected by gears to the rotary shaft of a motor 429 secured to the lower portion of the inclinable head 418 for rotation of the chuck 426 and the rotary cutter 427.

The rotary cutter 427 may be of the type in which a plurality (normally three) of throw-away type cemented carbide tips are mounted circularly on the end face of a cylindrical head commonly referred to as, for example, an end mill or a mice cutter.

The diameter of the rotary cutter 427 is determined in correspondence with the width of the inside weld beads to be removed, that is preferably in the range of one to two times the bead width, because if the diameter of the rotary cutter is smaller than the width of the beads, the beads would be left partially unremoved, while on the other hand, if the diameter of the rotary cutter is larger than twice the width of the beads, this would cause the base metal on both sides of the beads to be cut away.

The rotational frequency of the rotary cutter 427 is steplessly adjustable and its optimum value is determined preferably in correspondence with the quality of the material and the size of the beads of the straight seam welded pipe.

A slide base 431 is attached slidably to the inclinable head 418 through a dovetail groove 430. A longitudinally tracing roller 432 is attached to the top of the slide base 431 in proximity to, but not so close as to interfere with, the rotary cutter 427. A screw rod 433 positioned vertically with respect to the inclinable head 418 has its upper end threadably engaged with the lower portion of the slide base 431. By rotating the screw rod 433 the height of the tracing roller 432 can be adjusted relative to the rotary cutter 427. Denoted by 434 is a lock nut of the screw rod 433.

Figure 17:
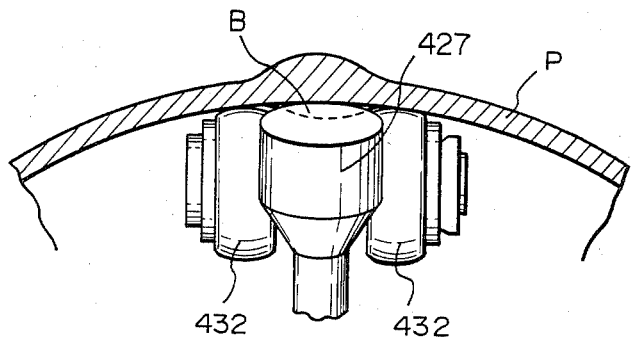
FIG. 17 is a front view taken along the line XVII—XVII of FIG. 14, showing the relationship between the positions of weld beads, a tracing roller and a rotary cutter.
Figure 18:
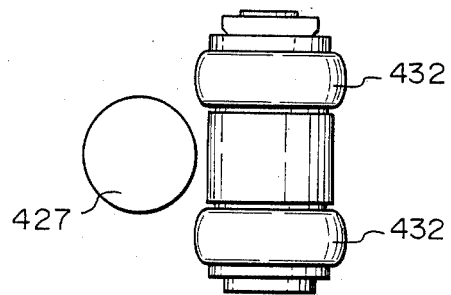
FIG. 18 is a plan view of the elements of FIG. 17.

Relative positions of the tracing roller 432, the weld beads B and the rotary cutter 427 will be described in detail with reference to FIG. 17, which is a front view, and FIG. 18, which is a plan view. The tracing roller 432 is provided as a pair of rollers with the weld beads B therebetween. In this case, by making the distance between the rollers close to the width of the beads, a predetermined amount of cutting can be maintained substantially without causing any influence that would result in the chestnutshaped cross section of the type shown in FIG. 6. Further, by ensuring that the tracing rollers 432 are only brought toward the rotary cutter 327 within a range in which they do not contact latter, the amount of cutting can be kept constant, substantially without causing any influence that would result in bending at the ends of the welded pipe P of the type shown in FIG. 7.

The operation of the apparatus according to the present invention will now be described.

First of all, as shown in FIGS. 1, 8-13, and 20, the lock pin cylinder 115 (see FIG. 9) is actuated to adjust the lateral position of the machine frame 11 by the laterally driving means 16 with the holding member 2 fixed horizontally and to adjust the height of the lifting table 10 for treatment of the pipe. In this state, the truck 13 is at the backwardmost position.

When the straight seam pipe P is set along the setting line L with its seam upward, the longitudinally driving means 15 is actuated after the position of the seam of the pipe has been adjusted. By actuation of the means 15, the gears 154 are moved forward and simultaneously provided with rotation by the rack 156, and the rack 155 is moved forward by rotation of the gears 154. That is, the truck 13 moves over a distance equal to twice the stroke of the means 15. By forward movement of the truck 13, the lower jaw 23 of the holding member 2 is inserted into the pipe P while, in the upper jaw 22, the contact pieces 334 of the tab plate cutting unit 3 are brought into contact with the end of the pipe on both sides of the tab plate T as shown in FIG. 11.

Figure 3:
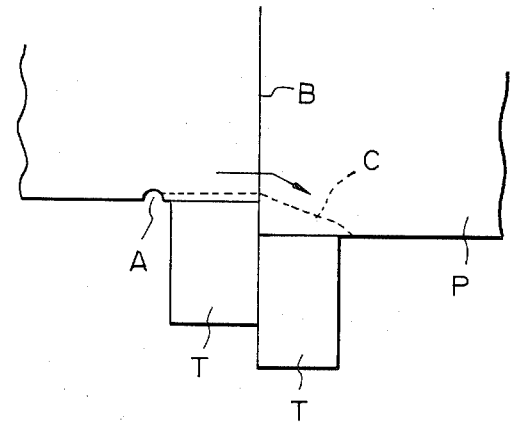
FIG. 3 is an illustration of a conventional tab plate cutting method.

Now, if the two tab plates T fail to match each other along the longitudinal direction as shown in FIG. 3, one of the contact pieces 334 is brought into contact with the end of the pipe earlier than the other by forward movement of the truck 13, whereby the connecting rod 332 therefor is moved backward and the backwardmost end of the connecting rod 332 passes by one of the sensors 344. Continued forward movement of the truck 13 brings the other contact piece 334 into contact with the end of the pipe to move the connecting rod 332 backward until the backwardmost end of it passes by the other sensor 344 and at that time the truck 13 stops to move forward. In other words, the truck 13 stops with the link 335 on the side where the tab plate T retracts taking the position perpendicular to the longitudinal direction of the pipe. By providing the truck 13 with two different operational speeds so that it can move forward at a high speed until a certain point and at a low speed thereafter, it is made possible to increase the stopping accuracy while also shortening the time period of its operation.

When the truck 13 stops, the cylinder 347 mounted on the upper jaw 22 is actuated with the lock pin cylinder 115 shown in FIG. 9 released to make the holding member 2 rotatable, and then the holding member 2 is fixed to the end portion of the pipe by the clamper 348 connected to the upper jaw 22 an the clamper 404 provided in the lower jaw 23.

When the holding member 2 is clamped to the end portion of the pipe, the cylinder 326 shown in FIG. 12 is operated from the extended position to the retracted position whereby the contact ball 327 of the tracing member 328 is resiliently urged to the outer peripheral surface of the pipe and the cutting torch 330 is brought to the stand-by position b shown in FIG. 11.

The movement of the cutting torch 330 will now be described in more detail. Lateral movement of the torch is achieved when the screw shaft 319 is rotated by driving the motor 320, and the movable block 318 is thereby moved laterally. In contrast to this, forward and backward movement of the torch is made in accordance with forward and backward inclination of the link 335 by lateral movement of the movable block 318 because the second tracing member 339 is urged normally to the rear of the link 335 by the spring 324. In addition, the amount by which the second tracing member 339 projects toward its support is changed by driving the motor 342, and this allows a different form of forward and backward movement to be effected than the forward and backward movement described above. The movement of the cutting torch 330 to the position b is rendered solely by the lateral movement of the movable block 318, and the movement thereof from the position c to the position b is rendered both by the lateral movement of the movable block 318 and by driving the motor 342.

When the tracing member 328 is urged to the outer peripheral surface of the pipe, the pipe is preheated at the position b by the cutting torch 330 which is fired beforehand by low pressure oxygen blowing. After being completely preheated, the motors 320 and 342 are driven to move the cutting torch 330 from the position b to the position a at which the torch is switched to high pressure oxygen blowing, and then the motors 20 and 342 are again driven to return the torch to the position b to start cutting. The cutting torch 330 is moved from the position c to the position e only by the lateral movement of the movable block 318 which is achieved solely by driving the motor 320.

While one link 335 extends perpendicularly relative to the longitudinal direction of the pipe, the other link 335 is pulled backward at its lateral end by the contact piece 334 and the connecting rod 332 in accordance with the degree of mismatch of the tab plates, the path of movement of the cutting torch 330 from the position c to the position e being in accordance with the degree of mismatch of the tab plates. At the midpoint d between the positions c and e or at the bead portion B, the speed of lateral movement of the movable block 318 is somewhat reduced so as to allow the bead portion to be completely cut.

As described above, the end of the pipe is preheated at the position b by the cutting torch 330 in a low pressure oxygen blowing condition and, thereafter, the cutting torch 330 is moved to the position a at which it is switched to its high pressure oxygen blowing condition. The torch 330 is not switched to a high pressure oxygen blowing condition at the position b in order to prevent the end of the pipe from being broken away (see portion A in FIG. 3) by high pressure oxygen blowing.

When the cutting torch 330 is brought to the position e, the motors 320 and 342 are driven again to move the cutting torch from the position f to the position g at which the cutting by the torch is stopped.

When the cutting is finished, the cutting torch 330 is returned to the position f or b and the cylinder 326 resumes its extended position.

A series of operations of the cutting torch 330 as described above may be automated by providing limit switches in the path of lateral movement of the movable block 318 and in the path of forward and backward movement of the second tracing member 339, and further the operation of temporarily reducing the speed of the movable block at the bead portion may be very easily automated by using these limit switches.

The tab plates T thus cut away from the pipe body are discharged into the scrap bag 141 through the chute 14 shown in FIG. 9.

After completion of one cutting cycle, the truck 13 is returned to the completely retracted position for the next cutting cycle.

The operation of the weld bead removing unit 4 will now be described with reference to FIGS. 1, and 14 to 20.

Figure 19A:
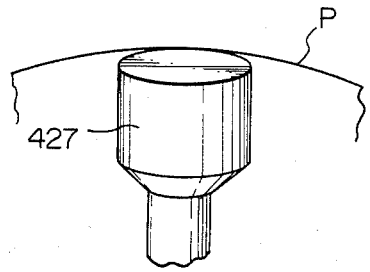
FIGS. 19A and 19B are front views of the rotary cutter.
Figure 19B:
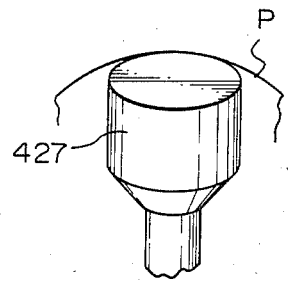

Before the lower jaw 23 of the U-shaped holding member 2 is inserted into the pipe P, the angle of inclination $\theta$ of the inclinable head 418 relative to the second movable base 414 is determined. Since the radius of the arc of the bead cutting surface is adjusted by changing the angle of inclination $\theta$ as shown in FIGS. 19A and 19B, the angle of inclination $\theta$ is determined such that the radius of the arc of the bead cutting surface is conformable with the radius of the arc of the inner surface about the bead portion of the welded pipe P. The angle of inclination $\theta$ is adjusted by loosening the lock bolt 424, rotating the screw rod 421 to the angle of inclination $\theta$, and then fastening the lock bolt 424.

Together with the adjustment of the angle of inclination $\theta$, the position of the tracing roller 432 is determined. Since the height of the tracing roller 432 relative to the rotary cutter 427 determines the depth of cutting into the weld beads B as shown in FIG. 17, the tracing roller 432 is positioned at a height at which the bead cutting surface will be smoothly contiguous with the inner surface of the base metal around it. To this end, the lock nut 434 is loosened, the screw rod 433 is rotated to determine the height of the slide base 431, and then the lock nut 434 is tightened.

After the first movable base 405 has been retracted, the second movable base 414 is positioned at its lowest limit.

After the preparatory operations described above have been finished, the lower jaw 23 of the U-shaped holding member 2 is inserted into the welded pipe P in a position parallel to the axis of the pipe. The lower jaw 23 is inserted into the pipe P, as shown in FIG. 14, with the rotary cutter 427 thereon positioned close to the end of the pipe P and under the tab plate T.

After the upper jaw 22 has been clamped, the motor 429 is driven to rotate the rotary cutter 427 and, at the same time, the cylinder 416 is driven as an urging means to move upward the second movable base 414 and the inclinable head 418. Then, the motor 407 in the front part of the lower jaw 23 is driven to rotate the nut 411 and thereby move the screw shaft 412 forward, whereby the first movable base 405 connected thereto is in turn moved forward. By this series of operations the rotary cutter 427 continuously cuts the weld beads B while moving forward until the tracing roller 432 is brought into contact with the inner wall of the welded pipe P or until the cutter 427 reaches the predetermined cutting depth, and after the cutter 427 has reached this predetermined cutting depth, the cutter 427 continues to cut the weld beads B along the inner wall of the base metal on both sides of the weld beads B while maintaining the predetermined cutting depth under the control of the tracing roller 432. The cutting surface of the weld beads B has, as described with respect to the preparatory operation, an axially cross-sectional shape contiguous with the inner surface of the base metal on both sides of the weld beads and an axially longitudinal cross-sectional shape along the inner surface of the base metal irrespective of the presence of bending of the pipe at its ends.

After a required length of cutting has been completed, cutting in the forward direction is continued while the second movable base 414 and the inclinable head 418 are moved down slowly by driving the cylinder 416 until the cutting surface of the weld beads B falls in line with the height of the weld beads B before cutting. Operation of the rotary cutter 427 from the start to the end of cutting is shown in FIG. 16.

When the cutting operation is completely finished, the first movable head 405 is returned to the limit of retraction for the next cutting operation. The second movable base 414 is returned to the lower limit and the rotary cutter 427 is stopped. Then, the lower jaw 23 is removed from the welded pipe P.

The movement of the first movable base 405 may be automated by providing a limit switch at each of the positions corresponding to the end point of cutting (C in FIG. 16), the limit of forward movement (D in FIG. 16) and the limit of retraction (A in FIG. 16), respectively. Further, the stroke of the first movable base 405 may be changed by providing a limit switch movably along the path of movement of the first movable base 405.

The second movable base 414 may be automatically stopped by detecting the position of its lower limit. Detection of the upper limit of the second movable base 414 is not required because the tracing roller 432 is resiliently urged to the inner wall of the welded pipe P.

Further, the length of time required to start cutting can be reduced by making the cylinder 416 for driving the second movable base 414 operable at two speeds (high and low), and providing a contact type or non-contact type bead approach detecting means in close proximity to the tracing roller 432 so that the cylinder 416 is moved upward at high speed before the means detects the approach to the beads and at low speed after it detects the approach to the beads. Likewise, the length of time for downward movement of the cylinder 416 can be reduced by moving it at low speed while the means detects the bead approach and at high speed once the bead approach is no longer detected by the means.

In the first movable base 405 also, it is made possible to perform at high speed retraction or other actions which are not directly associated with cutting by making the base 405 operable at two different speeds (high and low).

The weld bead removing unit 4 according to the present invention is shown in FIG. 14 as being applicable to the welded pipe P with the weld seam upward so that when the weld beads are cut away from the pipe into chips, they fall down by the force of gravity and are thus removed so as not to become entangled at the cutting surface or to damage it. However, the unit 4 may also be applied to a welded pipe with the weld seam downward by inverting the unit itself.

Further, while the unit 4 is shown in FIG. 14 as being applicable to a large-size straight seam welded pipe wherein only the bead at the end portions of the pipe is removed, the unit 4 may also be applied to a relatively large size pipe, which has been electrically welded or otherwise, for the purpose of cutting the inside weld beads throughout its entire length. In this case, however, it is necessary to provide a form of construction in which the first movable base has a stroke corresponding to the overall length of the pipe or one in which the first movable base is fixed to a boom and the pipe is made axially movable. In the latter type of construction, it is not necessary to clamp the boom to the welded pipe.

Figure 20:
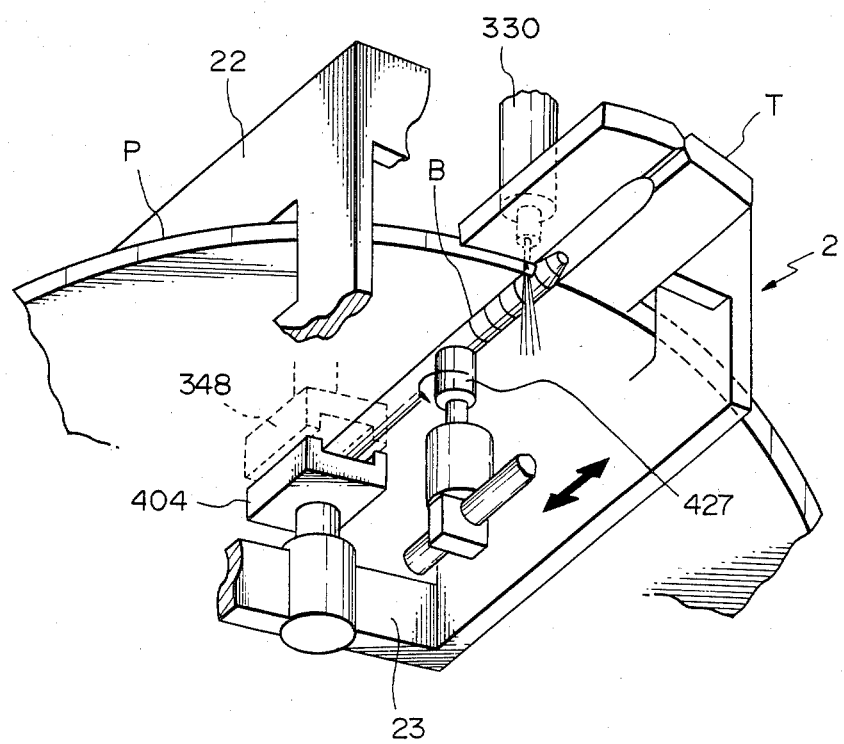
FIG. 20 is a frontal perspective view showing the relationship between the positions of a cutting torch and the rotary cutter.

As best shown in FIGS. 11, 16 and 20, the cutting torch 330 and the rotary cutter 427 are shifted apart from each other at their starting positions and the rotary cutter 427 moves away from the path of movement of the cutting torch 330. Accordingly, there is no possibility of their interfering with each other during operation.

As is obvious from the foregoing description, the tab plate cutting unit 3 according to the present invention is capable of detecting mismatch at the ends of a pipe easily by a purely mechanical means and of adjusting the path of movement of the cutting torch in accordance with the degree of mismatch. Therefore, the unit 3 requires no electrical computing device, is low in cost and high in reliability, and has very great practical value.

Further, since the second tracing member includes the longitudinally driving means which is independent from the support of the tracing member, the present invention makes it possible to select a wide range of paths of movement other than the automatic tracing described above to thereby prevent defects at the ends of the pipe which would be caused by blowing high pressure oxygen at the beginning of cutting and to reduce the angle of cutting at the ends of the pipe at the beginning and the end of cutting.

Further, since the tracing member supporting the cutting torch is in contact with the outer periphery of the pipe at two positions spaced circumferentially apart, it is possible to maintain the cutting torch at its position at right angles to the outer periphery of the pipe and at a constant distance therefrom irrespective of where the cutting torch is along the path of its movement.

Furthermore, by setting the lateral movement pattern of the movable block at a low speed in the bead portion and at a high speed in other portions of the pipe, it is possible to cut the bead portion completely without any substantial reduction in cutting efficiency.

Figure 4:
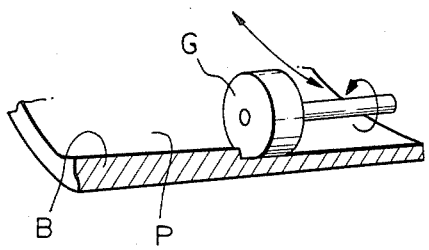
FIGS. 4 and 5 are illustrations of conventional weld bead removing methods.
Figure 5:
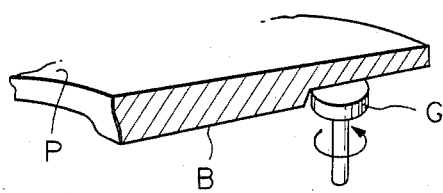

Further, in the bead removing unit 4 according to the present invention, use of the rotary cutter 427 as the cutting tool provides various advantages over the conventional use of a grinding wheel such that, since the rotary cutter has a higher cutting ability than the grinding wheel, the bead removing speed is increased; since the rotary cutter has a longer life and, accordingly, a lower frequency of need for replacement, the working ability and economic efficiency of the unit are improved; since the rotary cutter is less liable to cause abrasion of the working surface, troublesome readjustment of the position of the tracing roller 432 is made unnecessary unless the bead cutting depth is to be changed; since the rotary cutter causes no dust and much less vibration than the prior art, it is much less likely to lower the accuracy of machines operating in the neighborhood and is advantageously combined with the tab plate cutting unit 3; and since the rotary cutter has a higher cutting ability and yet is smaller in diameter than the grinding wheel, the cutting tool in the unit 4 according to the present invention does not need to be moved, unlike in the conventional unit shown in FIGS. 4 and 5, and is therefore less liable to cut into the base metal of the pipe at the side of the bead.

Figure 6:
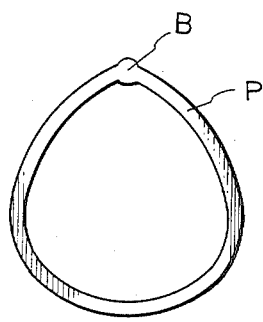
FIGS. 6 and 7 are illustrations of examples of defective welded steel pipes.

In addition, in the bead removing unit 4 according to the present invention, since the rotary cutter 427 is inclinable toward or away from the boom, it is capable of finishing the bead cutting face in an arc without the necessity for swinging the cutting tool as in the conventional unit shown in FIG. 4. Further, since the curvature of the arcuate surface is adjusted according to the angle of inclination of the rotary cutter in the bead removing unit 4 according to the present invention, it is possible to obtain thereby a cutting surface smoothly contiguous with the inner surface of the base metal of the pipe on both sides of the bead. And, since the rotary cutter is small in diameter and less liable to cut into the base metal of the pipe, it is made possible thereby to precisely control the thickness of the pipe in the bead portion B and in its neighborhood even in a welded pipe having a marked chestnut-like section as shown in FIG. 6.

Figure 7:
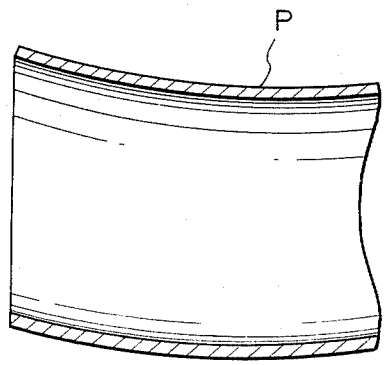

Further, in the bead removing unit 4 according to the present invention, since the cutting depth of the rotary cutter 427 is controlled by the tracing roller 432 disposed in proximity to it and since the tracing roller is resiliently urged against the inner wall of the welded pipe, the unit 4 is applicable to a welded pipe having a marked upward bend at its ends in the manner shown in FIG. 7 and secures a stable cutting depth, precisely controls the thickness of the pipe in the circumferential direction, and greatly increases the cutting accuracy over the entire bead portion.

Furthermore, in the bead removing unit 4 according to the present invention, since stable bead cutting is made possible by the positional relationship between the rotary cutter 427 and the tracing roller 432 and by the angle of inclination of the rotary cutter 427, without the necessity for any optical measuring means such as laser, the unit 4 is simple in construction, easy in maintenance, high in durability and reliability, and low in equipment cost. The unit 4 is also superior in economy because it can be automated by providing very simple sensors such as limit switches.

While we have shown and described specific embodiments of our invention, it will be understood that these embodiments are merely for the purpose of illustration and description and that various other forms may be devised within the scope of our invention as defined in the appended claims.

What is claimed is:

1. An apparatus for treating the ends of a large-diameter welded steel pipe, in which a pipe having a straight seam and tab plates attached to ends of the pipe as an extension of the seam is laid down along a setting line with the seam upward, said apparatus comprising:
   a machine frame assembly so disposed along the setting line as to be movable longitudinally, laterally, and vertically;
   a U-shaped holding member so connected to said machine frame assembly as to be rotatable about the setting line and a horizontal line perpendicular to the setting line;
   a tab plate cutting unit attached to an upper jaw of said U-shaped holding member; and
   a weld bead removing unit attached to a lower jaw of said U-shaped holding member;
   further wherein said tab plate cutting unit comprises:
   clamping means for fixing said upper jaw onto the outer surface of the pipe;
   a movable block movable on said upper jaw in the direction perpendicular to the straight seam;
   a lateral driving means for driving said movable block;
   a vertical member attached to said movable block so as to be movable longitudinally of the pipe and to be movable toward and away from the outer surface of the pipe by the action of an urging means;
   a tracing member which has two contact points on the outer surface of the pipe and arranged circumferentially thereof and which is pivotally supported on said vertical member by a shaft extending axially of the pipe;
   a cutting torch mounted downwardly on said tracing member;
   a pair of contact pieces in resilient contact with the end of the pipe on both sides of the tab plate;
   links which are connected to said contact pieces and held parallel respectively to a line connecting said contact pieces and said cutting torch, and pivotally supported so as to be bendable on a substantially horizontal plane at positions corresponding to said contact pieces and said cutting torch, with the pivotal point at a mid-point fixed to the frame which forms said upper jaw;
   a second tracing member for tracing the longitudinal profile of said links, connected to said vertical member so as to be movable toward and away from said movable block; and
   a driving means for driving said tracing member longitudinally of the pipe relative to a support of said tracing member.

2. An apparatus for treating the ends of a large-diameter welded steel pipe, in which a pipe having a straight seam and tab plates attached to ends of the pipe as an extension of the seam is laid down along a setting line with the seam upward, said apparatus comprising:
   a machine frame assembly so disposed along the setting line as to be movable longitudinally, laterally, and vertically;
   a U-shaped holding member so connected to said machine frame assembly as to be rotatable about the setting line and a horizontal line perpendicular to the setting line;
   a tab plate cutting unit attached to an upper jaw of said U-shaped holding member; and a weld bead removing unit attached to a lower jaw of said U-shaped holding member;

further wherein said weld bead removing unit comprises:

a first movable base disposed on said lower jaw for parallel movement relative to the inside weld beads;

a second movable base attached to said first movable base for movement toward and away from the inside weld beads by the action of an urging means;

an inclinable head attached to said second movable base for inclination toward and away from the direction of movement of said first movable base;

a rotary cutter attached to said inclinable head for inclination toward said inside weld beads;

a tracing roller attached to said inclinable head in proximity to said rotary cutter for adjustment of the amount by which said rotary cutter projects relative to said head; and a clamping means attached to said lower jaw for fixing said lower jaw onto the inner surface of the pipe.

* * * * *